United States Patent
Pleasant

(10) Patent No.: US 9,466,224 B1
(45) Date of Patent: Oct. 11, 2016

(54) MOBILE MODULAR LAB

(71) Applicant: Cheryl Leonard Pleasant, Fresno, CA (US)

(72) Inventor: Cheryl Leonard Pleasant, Fresno, CA (US)

(*) Notice: Subject to any disclaimer, the term of this patent is extended or adjusted under 35 U.S.C. 154(b) by 229 days.

(21) Appl. No.: 13/941,206

(22) Filed: Jul. 12, 2013

(51) Int. Cl.
  *A47B 43/00* (2006.01)
  *G09B 19/00* (2006.01)

(52) U.S. Cl.
  CPC .................................. *G09B 19/00* (2013.01)

(58) Field of Classification Search
  CPC ...... A47B 21/06; A47B 7/0041; A47K 4/00; G09B 25/02
  USPC ......... 483/3; 4/526–528, 599, 600; 135/116, 135/121, 904; 52/36.1, 36.2; 280/651; 434/365, 369, 402, 404, 428, 430; 312/258, 262
  See application file for complete search history.

(56) References Cited

U.S. PATENT DOCUMENTS

| | | | | |
|---|---|---|---|---|
| 2,867,045 A | * | 1/1959 | Millgate | G09B 5/02 359/443 |
| 4,202,676 A | * | 5/1980 | Pelosi et al. | 96/416 |
| 4,545,768 A | * | 10/1985 | Hinnen | G09B 19/12 434/174 |
| 4,696,652 A | * | 9/1987 | Reeder | A63H 33/30 434/219 |
| 5,072,999 A | * | 12/1991 | Trotta | G07C 13/02 235/51 |
| 5,131,849 A | * | 7/1992 | Perrero | G09B 23/20 434/281 |
| 5,172,530 A | * | 12/1992 | Fishel | A47B 21/06 160/135 |
| 6,457,278 B1 | * | 10/2002 | Fleming | A47B 46/00 312/249.7 |
| 2003/0140571 A1 | * | 7/2003 | Muha | A47K 4/00 52/79.1 |
| 2009/0145050 A1 | * | 6/2009 | Dugand | A47B 47/0041 52/36.1 |

* cited by examiner

*Primary Examiner* — William Gilbert

(57) ABSTRACT

An all-in-one symmetrical mobile modular mechanical and electrical lab that may be used to explore, expose, educate and provide basic hands on training in core technical skills. The modular lab is constructed using more than seven different types of materials and a variety of fasteners to enhance the learning experience. The modular lab consists of a middle section and end sections connected by hinges. The modular lab has a design consisting of removable and interchangeable panels. Individual components are interchangeable and may be easily removed, replaced or customized. In one specialized embodiment, the modular lab may be used to simulate the mechanical operation of a typical air conditioning system. The modular lab folds in to ease transporting and is mounted on wheels which makes it easy to move. Never before has a compact mobile lab existed that allows as many as twelve (12) individuals to utilize at any given time.

1 Claim, 16 Drawing Sheets

MOBILE MODULAR LAB

CROSS-REFERENCE TO RELATED APPLICATIONS

Not applicable.

REFERENCE TO SEQUENCE LISTING, A TABLE, OR A COMPUTER PROGRAM LISTING COMPACT DISC APPENDIX (IF APPLICABLE)

Not applicable.

STATEMENT REGARDING FEDERALLY SPONSORED RESEARCH OR DEVELOPMENT (IF APPLICABLE)

Not applicable.

BACKGROUND OF THE INVENTION

1. Technical Field

The present invention broadly relates to education and demonstration in the general fields of science, technology, engineering and math and more precisely it relates to any technical or vocational field, craft or trade that requires a basic understanding of how and why mechanical and electrical systems and components function and operate.

2. Description of Related Art

The innovative all in one new and useful symmetrical mobile modular lab provides cost effective practical exercises and technical learning activities. The modular lab engages students regardless of learning style in practical activities to enhance appreciation and understanding of the various engineering disciplines and technical fields. The visual learner makes up about 65% of the population. The individual with this learning style absorbs and recalls information best by seeing. The auditory learner makes up about 30% of the population. The individual with this learning style absorbs information best through the sense of hearing. The tactile-kinesthetic learner makes up about 5% of the population. Tactile and kinesthetic learners absorb information best by doing, experiencing, touching, moving or being active in some way. The design of the modular lab allows as many as twelve (12) individuals to use simultaneously.

An informal teaching aide called a "trainer" is commonly used in some technical trades. The design of existing "trainers" was analyzed. Based on years of research, careful examination and evaluation, it is concluded that the majority of "trainers" currently in use are found to be piecemealed, complicated and outdated. Although there were some similarities, there was little consistency, no real standards and no high quality cost effective method of providing practical exercises and learning experiences to attract the best suited mechanically inclined individuals to the technical programs. Most, if not all of the "trainers", only targeted one aspect of the field because of the limited design.

There is a need for a product that ensures that individuals seeking technical positions in industry are thoroughly and well trained. For nearly a decade while managing the major building systems of industrial and commercial facilities, it was always difficult to find qualified entry level employees with the basic skills needed to troubleshoot and repair the major building systems. The demand continues to outweigh the supply although more than 7.8 million jobs have been lost in technical and mechanical areas since the recession began in 2007. As the economy begins to strengthen, total employment is expected to significantly increase by the year 2020. Employment in maintenance and construction is expected to rise 33 percent by 2020, adding about 1.8 million jobs. In the field of heating, air conditioning, and refrigeration (HVAC) which is a specialization of mechanical engineering, employment of mechanics and installers is expected to grow 34 percent through 2020, much faster than the average for all occupations. Certified, trained and qualified technical professionals are in high demand.

Commercial and residential building construction, in general, will drive employment growth as industry continues to recover from the recession. According to recent research by Spokane Community College (Spokane), HVAC is essential today for personal comfort, medical health, food preservation, water supply and work productivity. Homes, office buildings, industrial plants, airplanes, cars and computer technology all rely on complex HVAC systems to create and maintain safe, healthy and comfortable living and working environments. Many industrial, medical, technical and commercial processes also depend on sophisticated heating, cooling air quality and ventilation systems. In fact, all human activities rely on HVAC in one way or another. HVAC mechanics and installers work in homes, retail establishments, hospitals, office buildings, and factories—anywhere there is climate-control equipment that needs to be installed, repaired, or serviced. The growing number of sophisticated climate-control systems is also expected to increase demand for qualified technicians in the field of HVAC. The growing emphasis on energy efficiency and pollution reduction and regulations prohibiting the discharge and production of older types of refrigerant pollutants will result in the need to modify or replace many existing air conditioning systems. The increasing development of HVAC systems technology causes employers to recognize the importance of continuous education and keeping up to speed with the latest equipment and skills.

Job opportunities for technicians are expected to be excellent, particularly for those who have completed training at an accredited technical school or through a formal apprenticeship. Hence, technical school training or apprenticeship programs often provide an advantage and a higher qualification for employment. Engineering and architecture occupations are projected to add roughly 252,800 jobs. Through 2020, employment of civil engineers is expected to grow 19 percent, employment of mechanical engineers is expected to grow 9 percent, and employment of chemical engineers, electrical and electronics engineers and industrial engineers are each expected to grow 6 percent. Industries and occupations related to health care, personal care and social assistance, and construction are projected to have the fastest job growth between 2010 and 2020.

There is currently a need and there will continue to be a need for qualified entry level technical professionals. Great engineers possess a strong analytical aptitude, show attention to detail, have excellent communication skills, stay on top of developments in the industry, are creative, show an ability to think logically, are mathematically inclined, have good problem solving skills, are team players and have excellent technical knowledge. Spokane reports that technicians are problem solvers: experts who contribute to making equipment work better, more efficiently, quicker, and less expensively. Technicians familiar with computers and electronics will have the best job opportunities as employers continue to have trouble finding qualified technicians to work on complex new systems.

Existing best practices in the manner that technicians are being provided practical training in a controlled environment prior to entering the workforce have been identified. The program offered by the military, private technical schools, public community colleges and high schools were assessed. Past and current participants in these programs were interviewed. The facilities and labs were visited. Existing training and educational tools were evaluated.

The symmetrical mobile modular lab provides the best solution to the problem based on research and benchmarking efforts. The modular lab addresses challenges faced by many technical programs. On the exterior, equipment and technology is constantly changing. There may be a new make or model on the outside although the guts of these systems remain the same. Because of limited funding dedicated to technical and vocational programs, many facilities and labs are outdated and offer little appeal to the new generation learner. By using the modular lab, individuals are provided the opportunity to touch, connect and work with actual components to gain a better understanding as to how mechanical and electrical components work together behind the scene. In lieu of needing a facility or actual lab to house actual bulky equipment into a traditional class room setting, the modular lab is mobile. It is foldable and easily transportable and can be rolled from room to room to stimulate discussion and promote interest in engineering and technology fields amongst individuals of all ages.

BRIEF SUMMARY OF THE INVENTION

The newly designed mobile modular lab is sufficiently different from what has been used. The newly developed mobile lab has a symmetrical modular design consisting of panels. Many parts, gadgets and components on the modular lab are color coded in a manner that is consistent with the colors used in industry. As many as twelve (12) individuals may practice and use the modular lab simultaneously. The modular lab may be used to provide hands on training in various engineering and multiple technical fields. It is based in part on nationally recognized curriculum and the customized Certified in 7® curriculum. It may be used to explore, expose, educate and explain technical aspects and principles. By design it incorporates a fast track hands on opportunity to link theory with practical. In one embodiment, mechanical features of the modular lab may be used to simulate the operation of a typical air conditioning system. This embodiment helps the individual easily connect theory to practical in one of the most important facility or building systems.

The modular lab design is streamlined and simplified in order to enhance learning. The modular lab is approximately 3' in depth, 6' in width and 5' in height when fully extended. When folded it is compact and only 6" in depth. It can be easily transported or moved throughout a building or from room to room as needed. It can easily be placed in any traditional or non-traditional environment. The panels may include components that address the following aspects and others: mechanical, electrical, chemical, environmental and safety.

One embodiment of the modular lab contains many of the actual electrical and mechanical components that are commonly found in buildings and systems. This embodiment may allow as many as twelve (12) individuals to practice and use the modular lab simultaneously. It contains at a minimum: six (6) controls, six (6) transformers, six (6) switches, six (6) terminal strips, six (6) contactors, and six (6) relays. The user is allowed to see, touch, remove and install components. Along with other applications, the mechanical and electrical embodiment may be used to simulate on a macro level how the components of a typical air conditioning system work to transfer heat and provide cooling.

The modular lab provides a hands on opportunity to link technical theory with practical. Many parts, gadgets and components on the modular lab are color coded in a manner that is consistent with the colors used in industry.

BRIEF DESCRIPTION OF THE SEVERAL VIEWS OF THE DRAWING

A listing of all figures by number with corresponding statements explaining what each figure depicts follows.

DETAILED DESCRIPTION OF THE INVENTION

The newly invented innovative all-in-one modular lab is used to explore, expose and provide basic hands on training in various engineering and technical fields.

The modular lab contains a base (Refer to FIGS. 1-8). The base is constructed of wood. The base is constructed similar to the frame of a typical residential home. All vertical pieces of wood are spaced 16" apart on center. The base consists of a middle section and two end sections. The inner and outer middle sections require four (4) 2"×4"×60" vertical pieces of wood. The end sections require four (4) 2"×4"×60" vertical pieces of wood. There are two (2) end sections connected to the right of the middle section and two (2) end sections connected to the left of the middle section.

Figure 17:
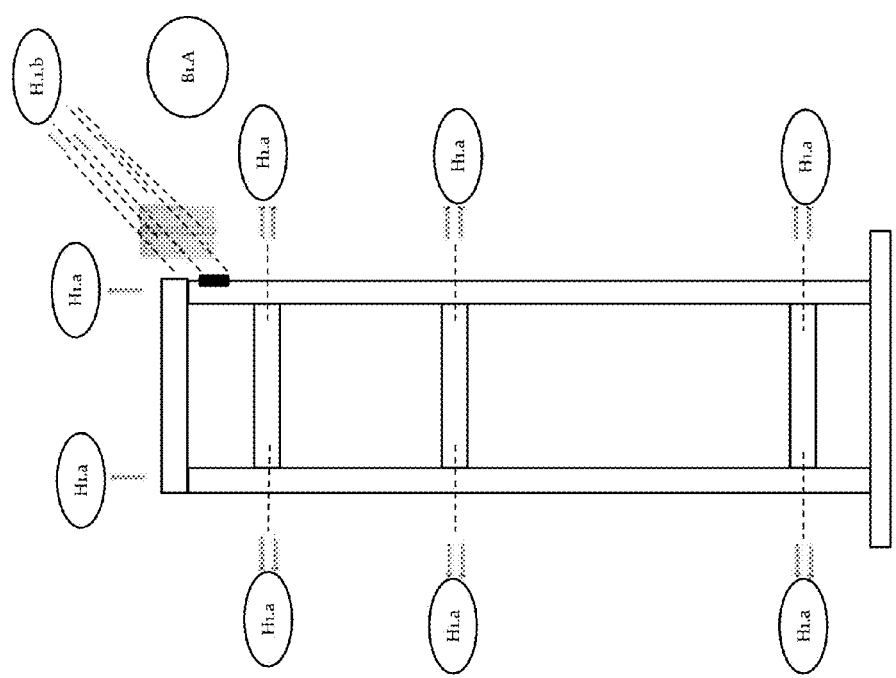
FIG. 17 shows the base hardware detail.
Figure 18:
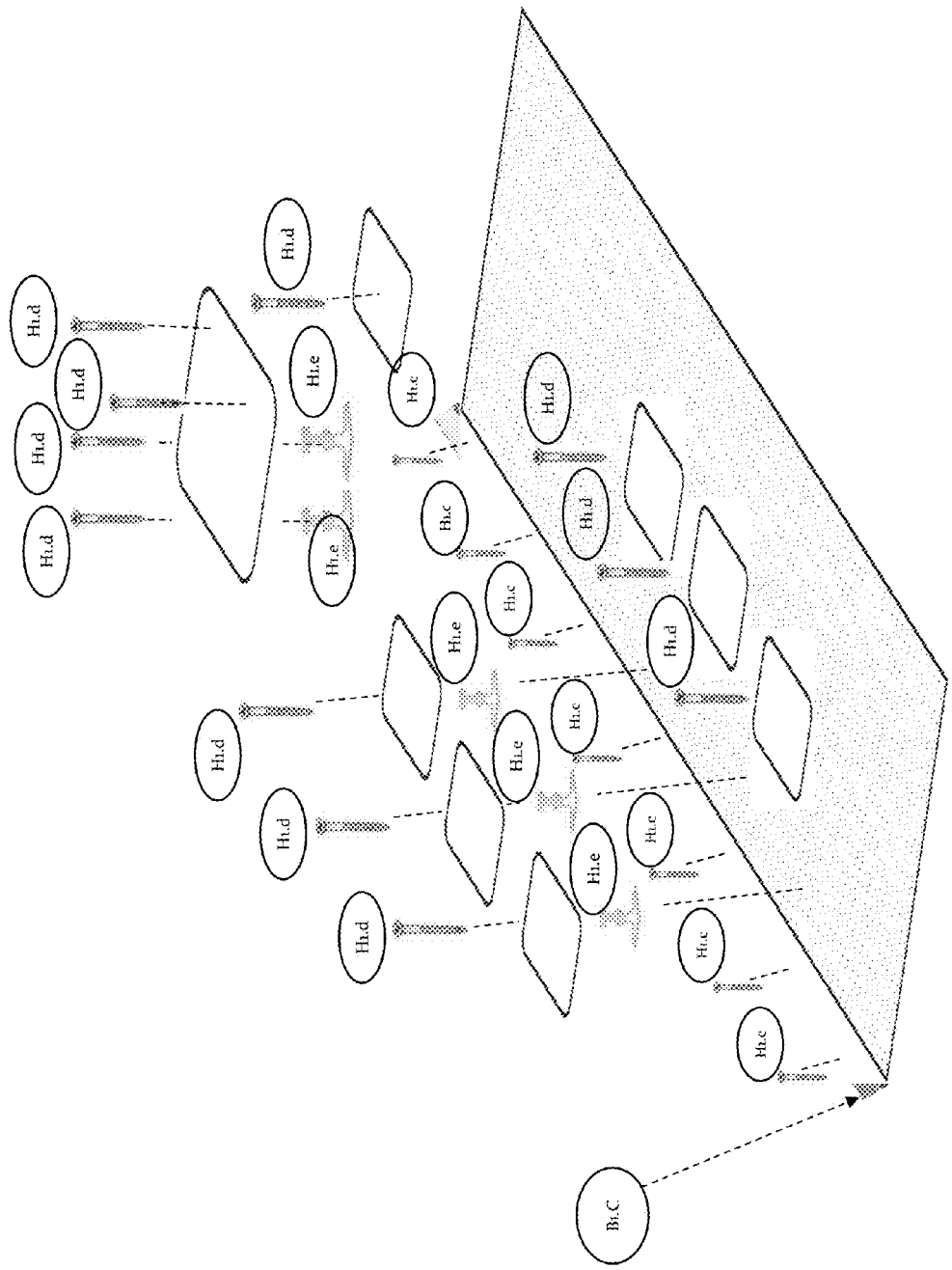
FIG. 18 shows the panel hardware detail.

The end sections of the base are connected to the outer middle section of the base by 3" hinges. There are a total of eight (8) hinges. There is one (1) hinge at the top and one (1) hinge at the bottom of each end section. The hinges are located 3" from the top and 3" from the bottom. When fully opened, the hinges allow the end sections to open to form a 45 degree angle. (Refer to FIGS. 17-18) When fully closed, the end sections lie flush against the middle section. This design allows for the end sections of the frame to be folded and positioned for ease of shipping, moving and transporting.

The modular lab contains wheels. There are a total of eight (8) wheels. This creates stability. There are two (2) wheels at the bottom of each end section. Each wheel at the bottom is approximately 1" from each end.

There are horizontal wood dividers on the modular lab. The middle section has three (3) 2"×4"×14" horizontal pieces of wood 6" inches from the bottom of the base. The end sections each have two (2) 2"×4"×14" horizontal pieces of wood 6" from the bottom and 6" from the top of the base end sections.

Figure 1:
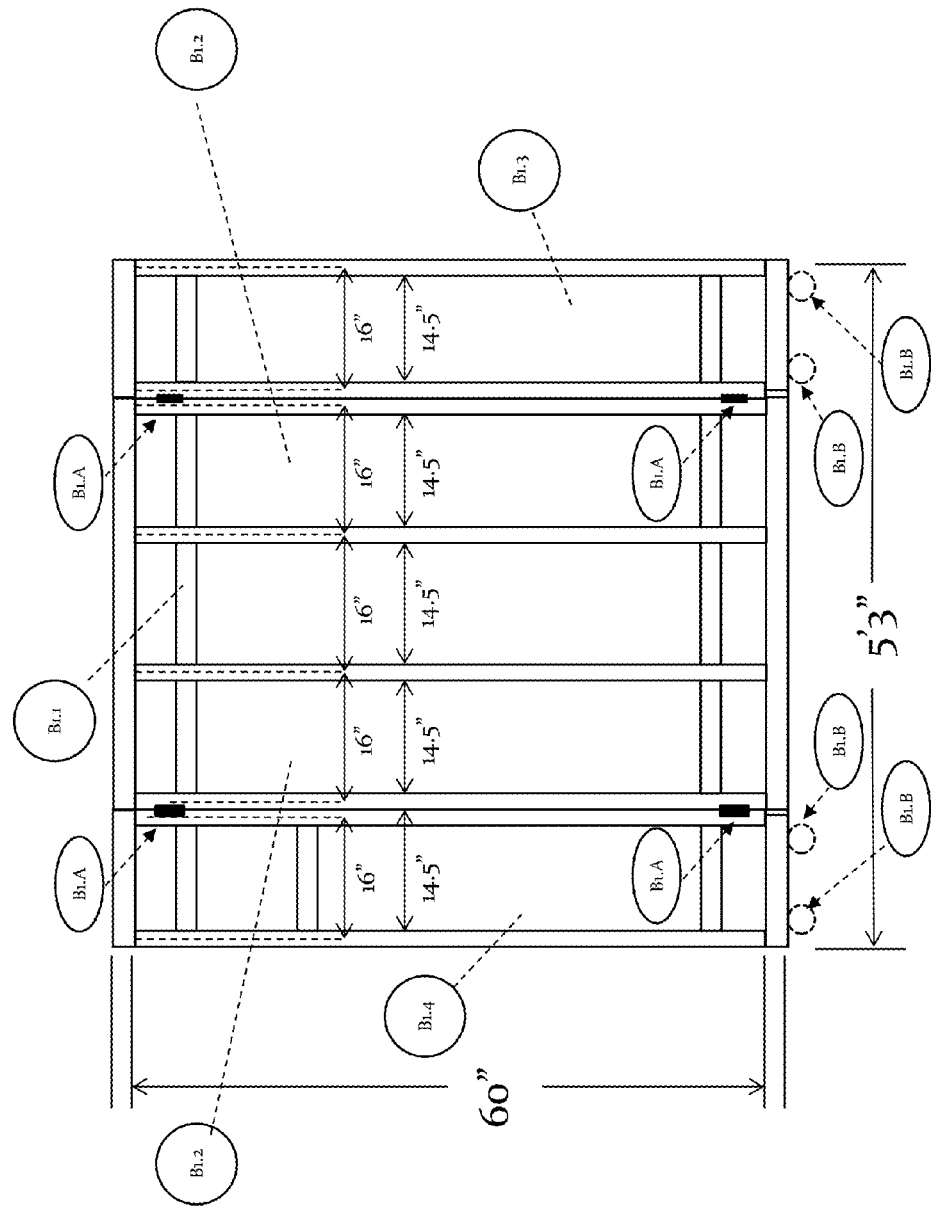
FIG. 1 is the front fully extended view of the base of the modular lab without panels, embodiment of the invention.
Figure 2:
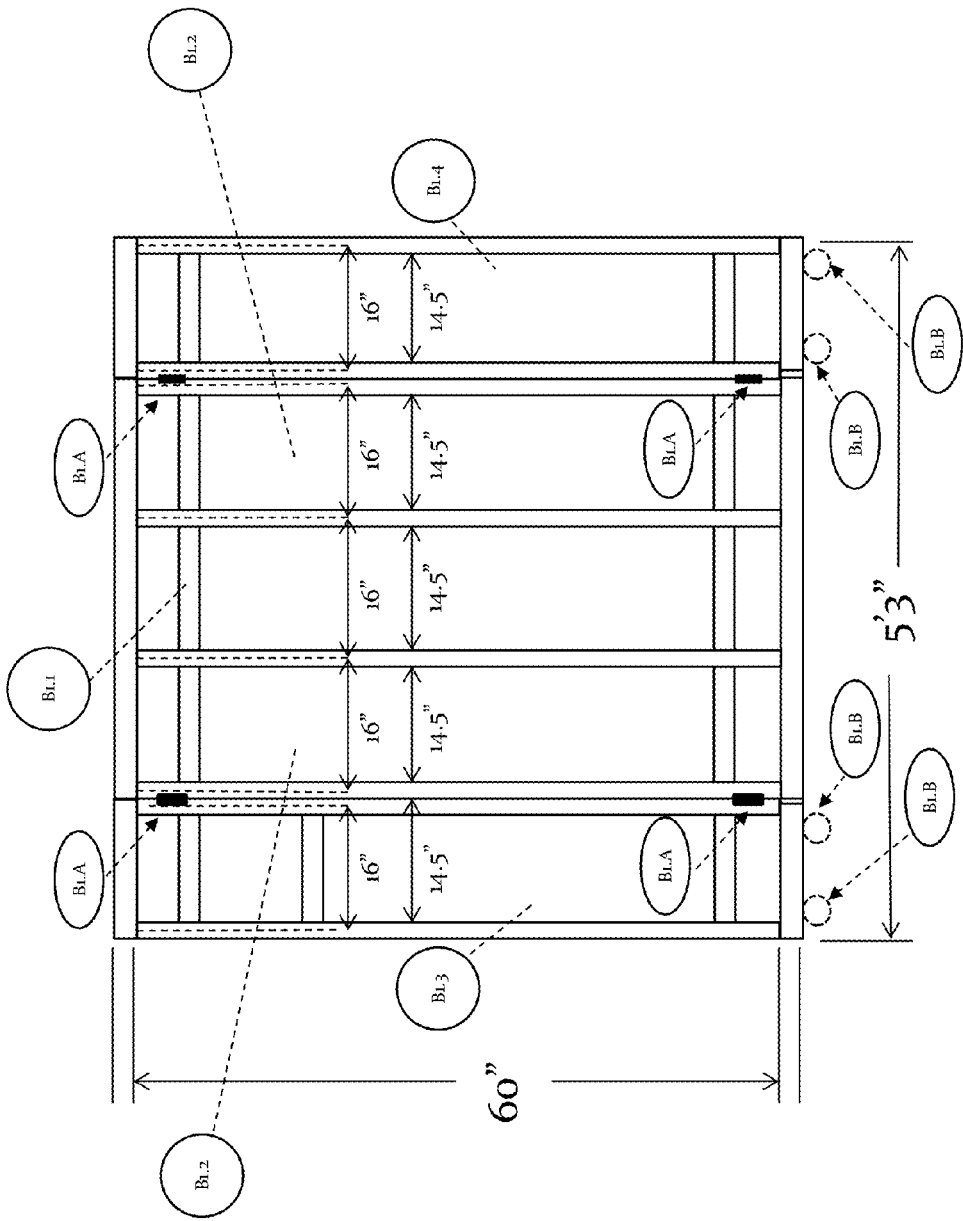
FIG. 2 is the back fully extended view of the base of the modular lab without panels, embodiment of the invention.
Figure 3:
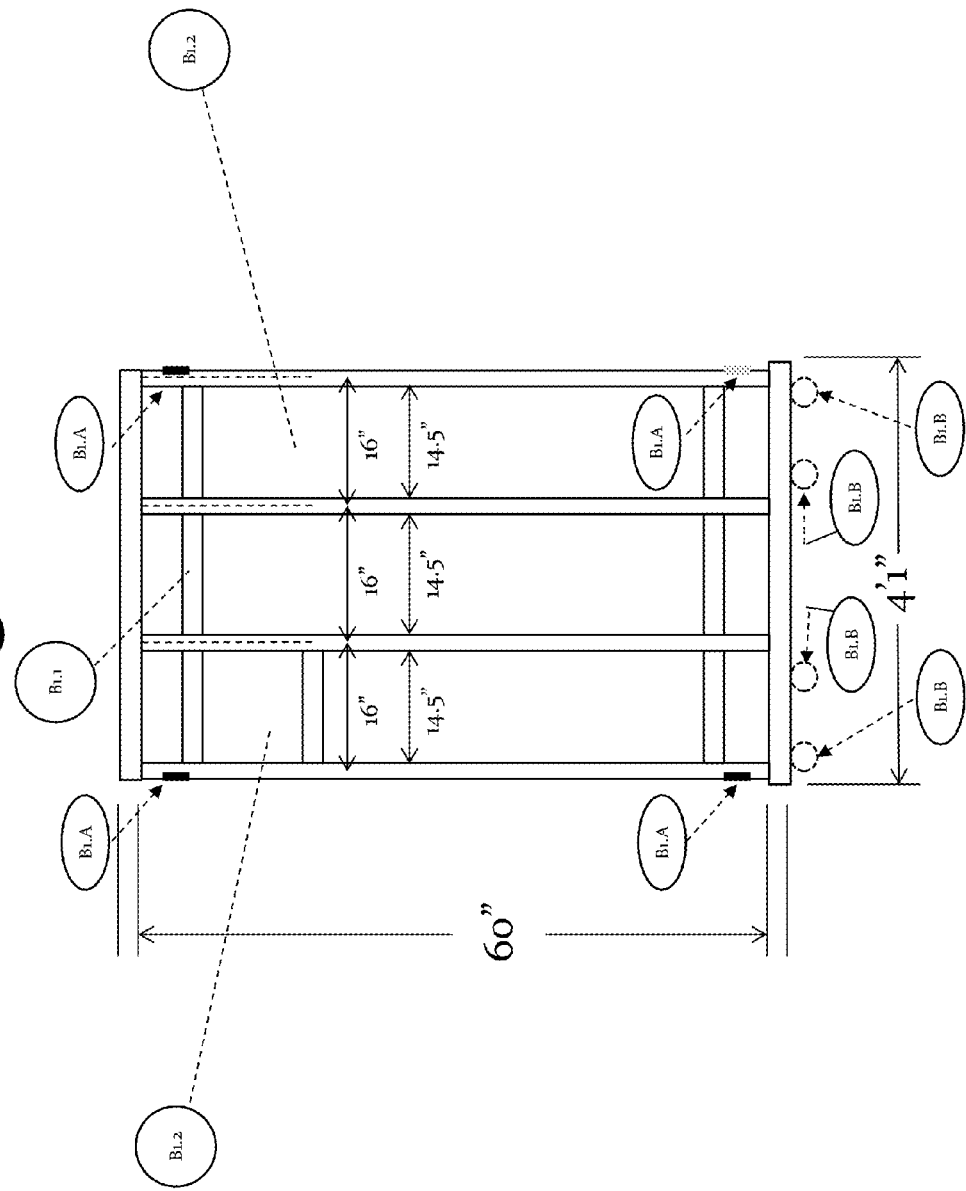
FIG. 3 is the front and back folded view of the base of the modular lab without panels, embodiment of the invention.
Figure 4:
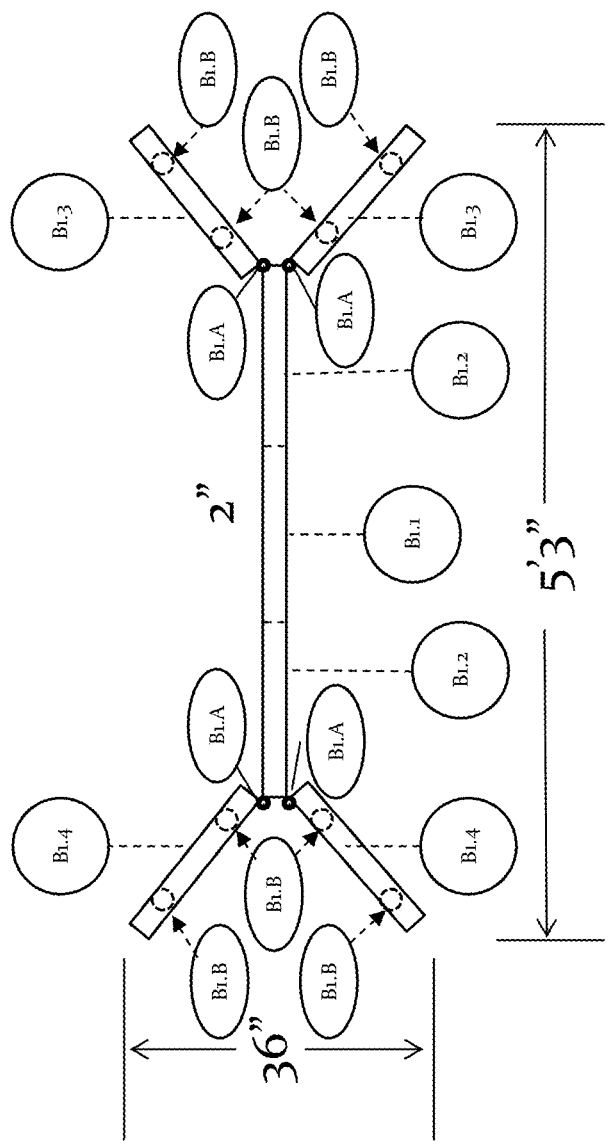
FIG. 4 is the top aerial fully extended view of the base of the modular lab without panels, embodiment of the invention.
Figure 5:
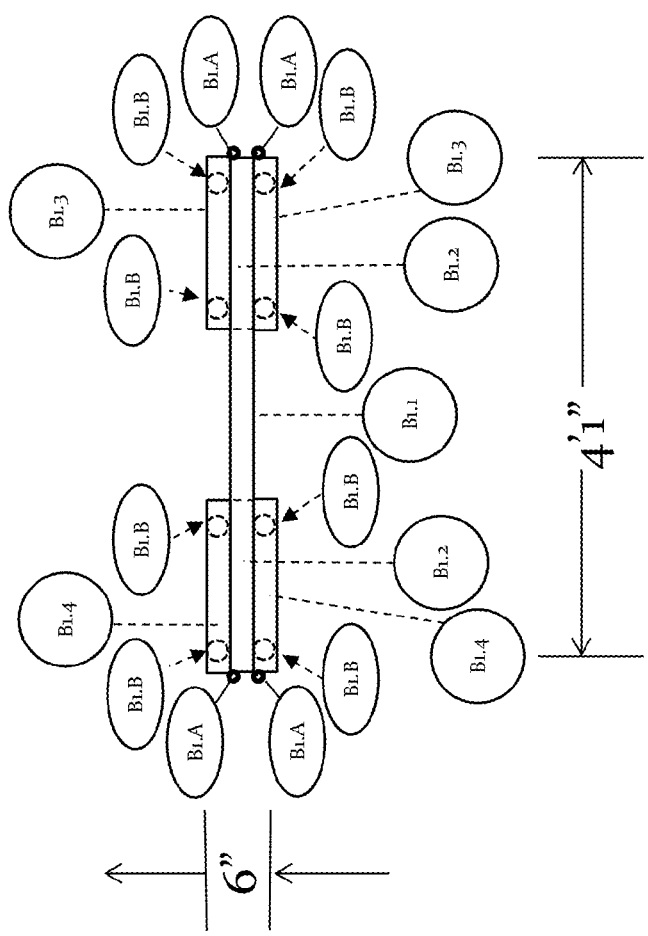
FIG. 5 is the top aerial folded view of the base of the modular lab without panels, embodiment of the invention.
Figure 6:
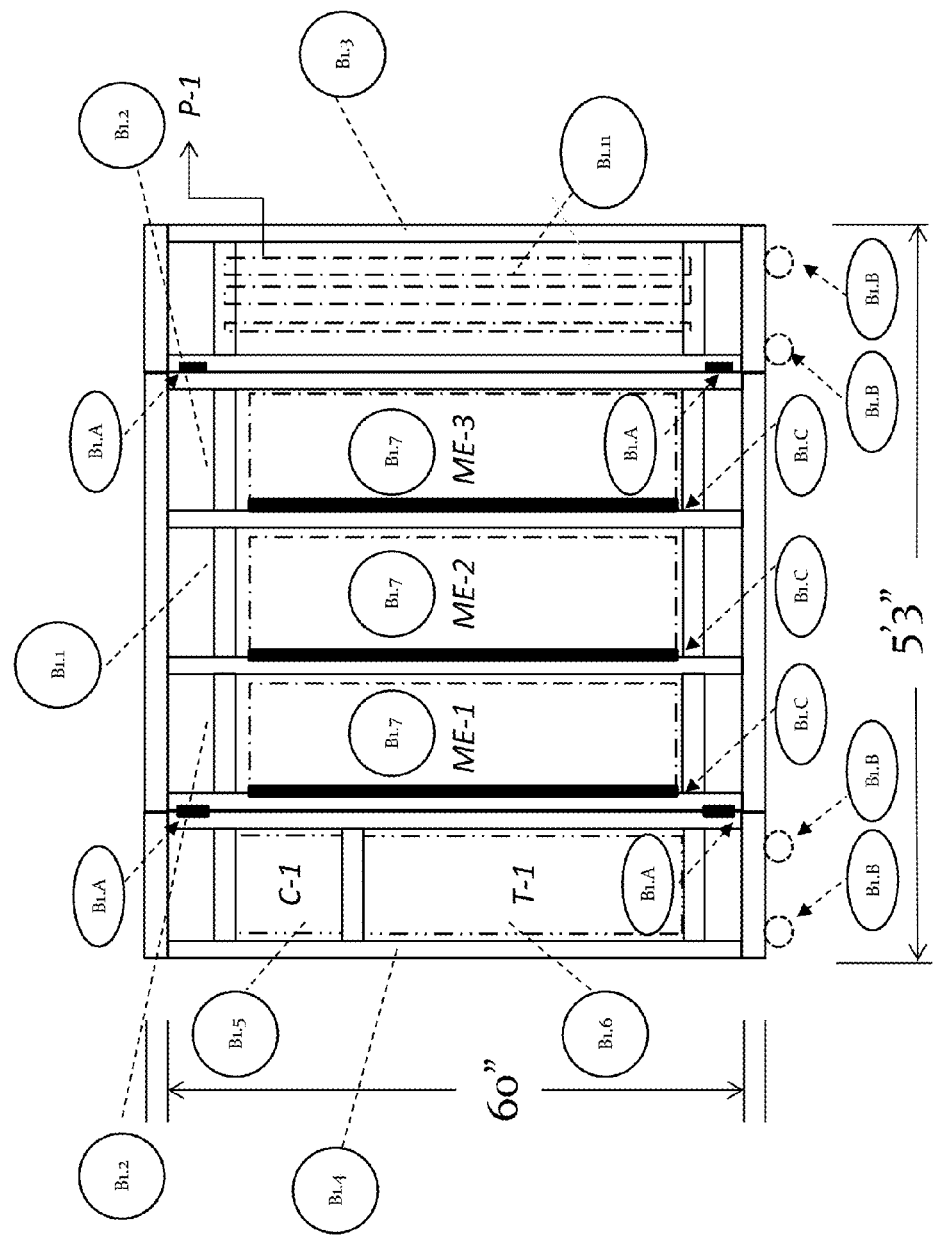
FIG. 6 is the front fully extended view of the base of the modular lab with panels, embodiment of the invention.
Figure 7:
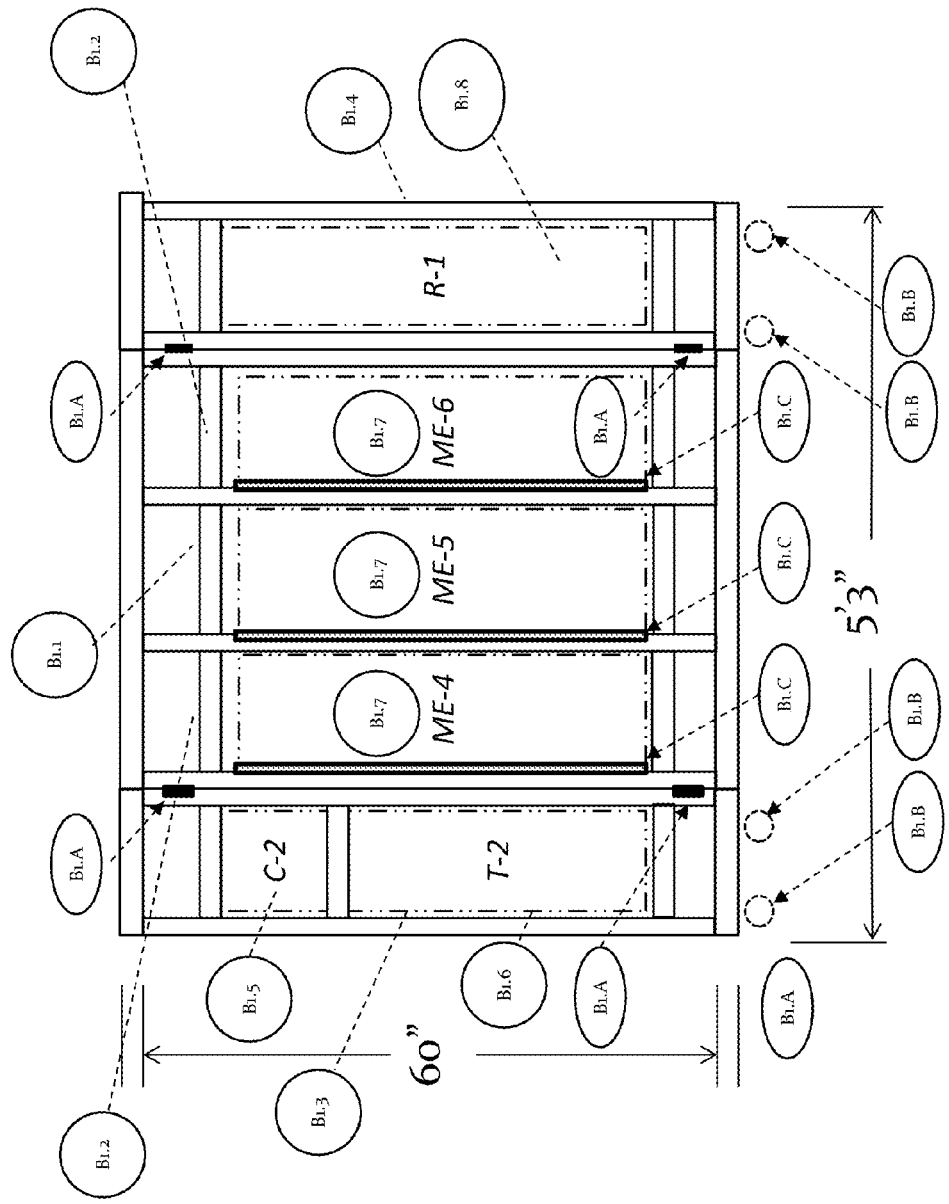
FIG. 7 is the back fully extended view of the base of the modular lab with panels, embodiment of the invention.
Figure 8:
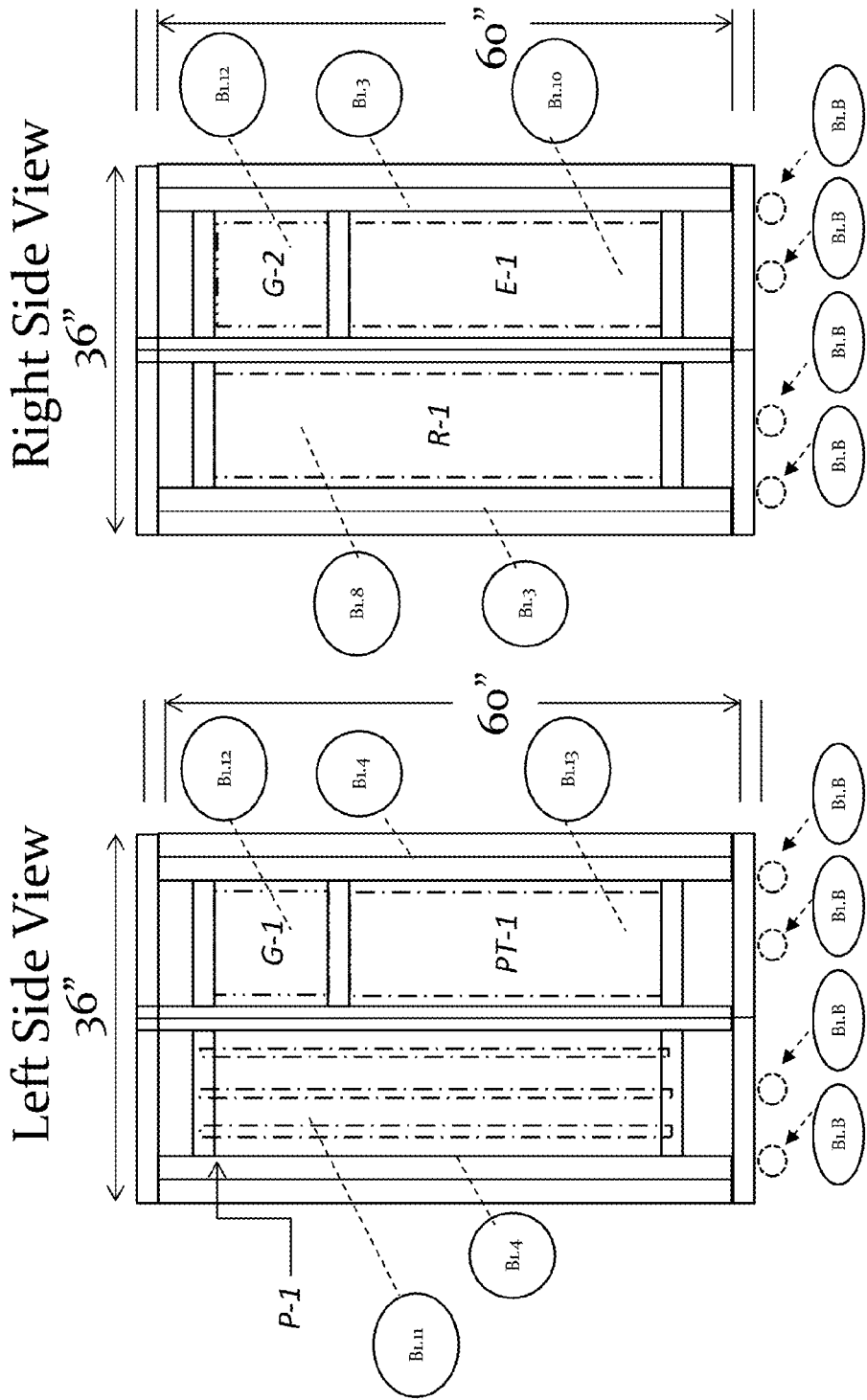
FIG. 8 is the right and left side fully extended view of the base of the modular lab with panels, embodiment of the invention.
Figure 9:
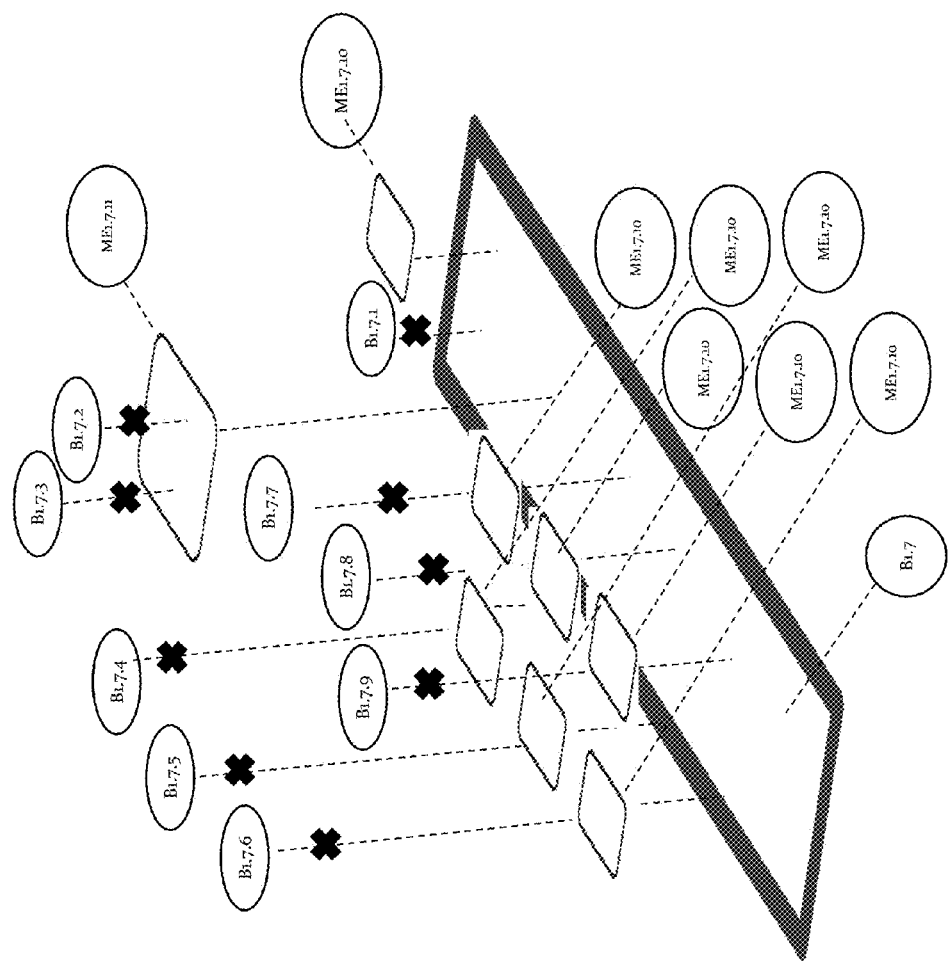
FIG. 9 is a perspective view of the mechanical and electrical panel embodiment of the modular lab showing the configuration and relative position of the individual components.

The modular lab contains panels. The panels are prefabricated and mounted to the base. The panels are made of sturdy tempered hardboard. One embodiment, consists of over sixteen (16) modular panels. There are six (6) electromechanical panels, two (2) control panels, one (1) safety placard, two (2) tool panels, one (1) chart placard, one (1) pictorial placard, two (2) gauge panels and one (1) tubing and piping panel. (Refer to FIG. 9) Highly visible signage is located on each panel.

In the electromechanical embodiment, power passing devices and loads are mounted to simulate the sequence of events during start up and operation of a building's mechanical system. Low voltage components are mounted. A switch is mounted 6" from the top. A transformer is mounted 3" from the switch. A terminal strip is mounted 1" to the right of the transformer. A contactor is mounted 5" below the transformer. A relay is located 4" below the contactor.

The modular lab contains indicator lights. The lights are illuminated when the modular lab is configured correctly. In one embodiment, a yellow lamp is mounted 2" to the right of the contactor. Yellow is used as a visual representation of the yellow control wire typically used to supply power from the control to the cooling contactor when connected correctly in an actual system. A green lamp is mounted 2" to the right of the relay. Green is used as a visual representation of the green control wire typically used to supply power from the control to the fan relay when connected correctly in an actual system. Additional mounting space is available to mount other electrical or mechanical components. A white lamp is mounted 2" to the right of space reserved or designated for future use. Signage is mounted below the panels. The signage is made of PVC.

In one embodiment, a transformer and terminal strip are mounted on a large plastic base. A switch is mounted directly onto the tempered hardboard. All other components are mounted on a small plastic base.

Figure 10:
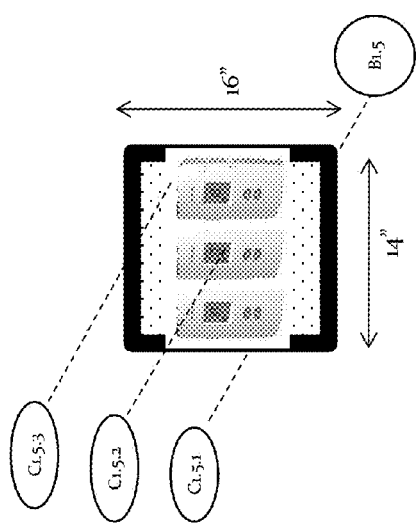
FIG. 10 is the front view of a control panel embodiment of the modular lab.

The modular lab contains a panel that may be customized to meet the specific training needs of the end user. The electromechanical embodiment contains control panels made of tempered hardboard. (Refer to FIG. 10) Thermostats are mounted as controls. When controls are properly connected the mechanical and electrical components are energized. Signage is mounted above the control panels. The signage reads "Controls". The signage is made of PVC.

Figure 11:
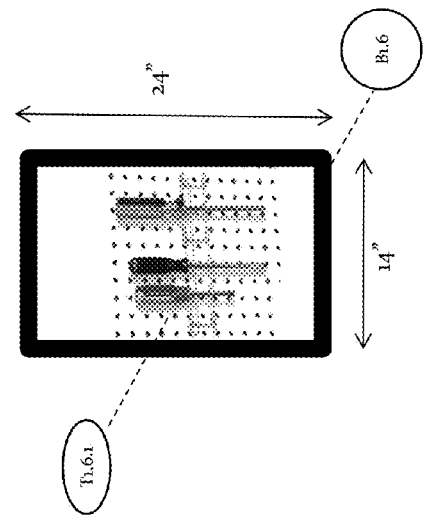
FIG. 11 is the front view of a tool panel embodiment of the modular lab.

The modular lab contains a tool panel (Refer to FIG. 11). There are two tool panels made of tempered hardboard. A removable tool holder is affixed for individuals to store tools. Signage is mounted above the tools panels. The signage reads "Tools". The signage is made of PVC.

Figure 12:
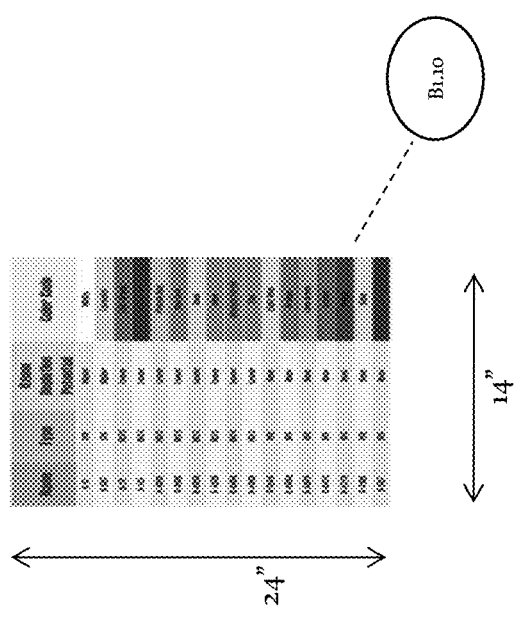
FIG. 12 is the front view of a environmental safety placard mounted on the modular lab.

The modular lab contains information regarding safety (Refer to FIG. 12). There is one relevant safety placard made of thick coroplast board. One embodiment of this panel provides information consistent with the Clean Air Act Section 608 technician certification requirements. Pertinent information regarding chlorofluorocarbons (CFC's), hydrocarbons (HC's) and hydrofluorocarbons (HFC) is mounted. The ozone depletion of the more commonly used refrigerants is provided for discussion. Concise information regarding the impact of these chemicals on the ozone layer is mounted. The information on this panel may be substituted for customized safety guidelines more relevant to any specialized discipline or technical field. Signage is mounted above the environmental panel. The signage reads "Environment". The signage is made of PVC.

Figure 13:
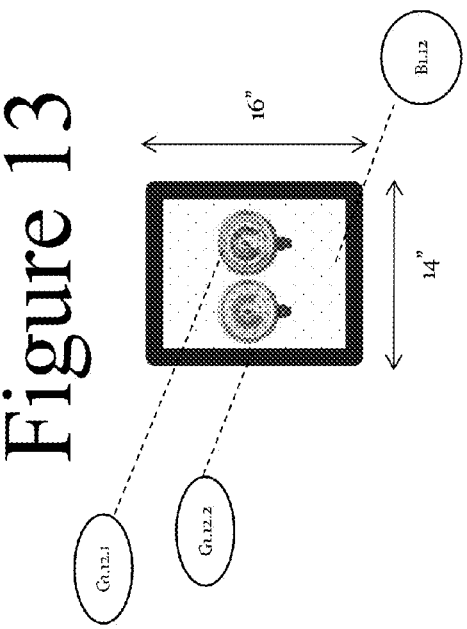
FIG. 13 is the front view of a typical gauge panel embodiment of the modular lab showing the configuration and relative position of the components.

The modular lab contains relevant gauges (Refer to FIG. 13). In one embodiment, there are two gauge panels made of tempered hardboard. The gauges may be removed and examined to practice reading and interpreting gauges. Signage is mounted above the gauge panels. The signage reads "Gauges". The signage is made of PVC.

Figure 14:
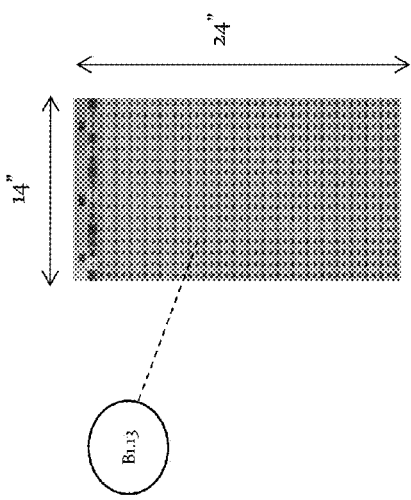
FIG. 14 is the front view of a chart placard mounted on the modular lab.

The modular lab contains a table or chart (Refer to FIG. 14). In one embodiment, there is a pressure temperature chart placard made of thick coroplast board. The chart is used to demonstrate and practice reading and interpreting tabular information. Signage is mounted above the pressure temperature chart panel. The signage reads "Pressure Temperature Chart". The signage is made of PVC.

Figure 15:
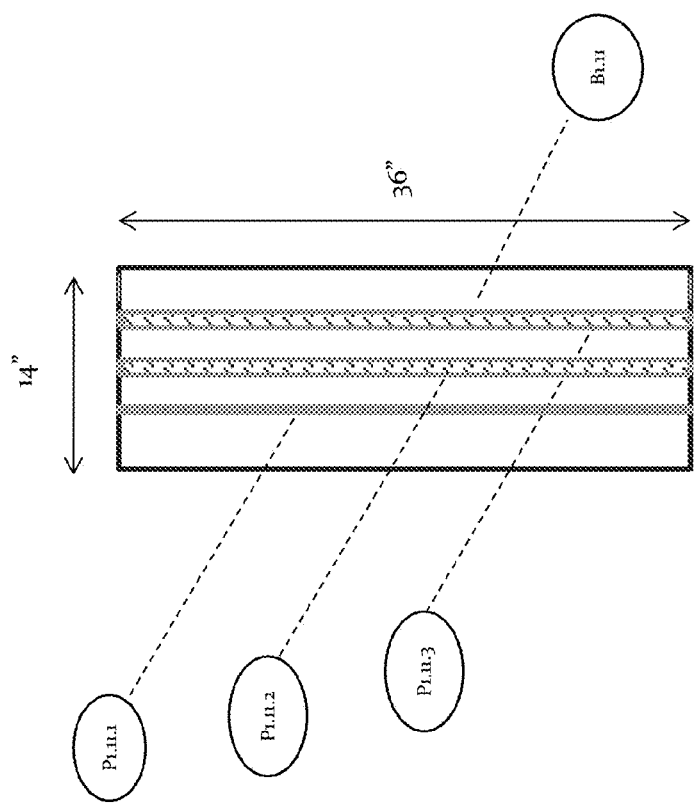
FIG. 15 is the front view of a tubing and piping panel embodiment of the modular lab showing the configuration and relative position of the components.
Figure 16:
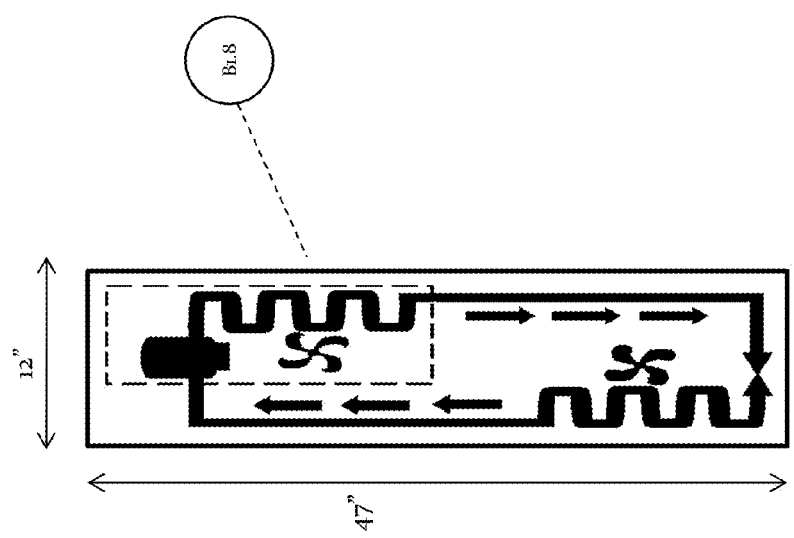
FIG. 16 is the front view of a pictorial placard embodiment of the modular lab showing the configuration and relative position of the components.

One embodiment of the modular lab contains tubing and piping (Refer to FIG. 15). The piping and tubing is inserted into predrilled holes. PVC and copper are used in the mechanical embodiment. PVC is commonly used for condensate lines. The larger diameter copper tubing represents the flow of refrigerant on the low side of the system in the suction line. The smaller diameter copper tubing represents the flow of refrigerant on the high side of the system as it travels through the discharge line and liquid line. The piping and tubing may be removed and the user may practice swaging, flaring and bending copper. Signage is mounted above the tubing and piping panels. The signage reads "Tubing and Piping". The signage is made of PVC.

The modular lab contains a relevant pictorial of the major components. The pictorial placard is made of plexiglass. In one embodiment, the refrigeration cycle and the major refrigeration components are shown on the pictorial. Signage is mounted above the pictorial panel. The signage is made of PVC.

Base and panel hardware and peripherals are included. A section utility hinge is used to connect the end base sections to the middle of the base. The material is steel with a zinc finish. The bearing type is plain. The range of motion is 270 degrees. There are three holes per leaf. A panel hinge is used to connect the panels to the middle sections. The material is aluminum alloy. The height is 48" and the width is 1¾ inches. The range of motion is 270 degrees. The thickness is 0.035 in. (Refer to FIG. 17) Machine and construction screws are used. #10-24×½ L round machine screws and 10-24 machine screw hex nuts are used. #8×1", #8×2", #8×¾" and #8×1¼" construction screws are used. 1" D-ring anchors and anchors are also used. (Refer to FIG. 18).

According to the National Center for Construction and Education Research and similar entities, there are core skills that are important for the individual who intends to work in a technical field. Due to advances in technology, the most promising and high demand fields now require more than just working well with the hands. The all-in-one modular lab highlights and provides practical activities for seven key areas. The modular lab builds confidence in the user by including common mechanical and electrical components and increasing the user's understanding of how and why these components work. Using the modular lab instills a safety centered mindset. Using the modular lab allows the user to better understand the importance of selecting the right tool and correctly using and storing hand tools. Using the modular lab allows the user to practice problem solving skills and analyze data and information to troubleshoot. The modular lab may also be customized and used to provide more specialized training in an area such as heating, ventilation and air conditioning as well as other technical fields.

A variety of building materials including, but not limited to wood, metal, aluminum, plexiglass, plastic, styrofoam, copper, PVC and pegboard are used. A variety of fasteners and hardware are included in the design. The modular design consists of removable and interchangeable panels which may be customized. As many as twelve (12) individuals may use and practice on the modular lab at any given time.

SEQUENCE LISTING

Not applicable.

I claim:

1. A mobile and modular training device comprising:
a base comprising a middle section and having a front side, a back side, an upper surface, a lower surface, a first side surface and a second side surface, said upper surface, said lower surface, said first side surface and said second side surface form a perimeter of said middle section and define a thickness of said middle section, said middle section comprising a wood frame having a first set of four wooden members extending in the direction from said upper surface to said lower surface and a second set of three wooden members, a respective one of said second set of three wooden members being placed between and connecting respective adjacent ones of said first set of four wooden members;

said base further comprising a first end section, a second end section, a third end section and a fourth end section, said first end section connected to said middle section by a first set of two hinges at an intersection of said front surface and said first side surface, said second end section connected to said middle section by a second set of two hinges at an intersection of said front surface and said second side surface, said third end section connected to said middle section by a third set of two hinges at an intersection of said back side and said first side surface and said fourth end section connected to said middle section by a fourth set of two hinges at an intersection of said back side and said second side surface, said first, said second, said third and said fourth set of two hinges permitting said respective end section to be in a first closed position against said middle section and a second fully opened position forming a forty-five degree angle with a plane extending parallel to said front side and said back side;

each said end section further comprising a set of two wheels connected to a respective bottom surface of said respective end section;

said base further comprising a first panel, a second panel and a third panel each hingedly connected to said front side of said base, and a fourth panel, a fifth panel and sixth panel each hingedly connected to said back side of said base.

\* \* \* \* \*